(12) United States Patent  
Parker et al.

(10) Patent No.: US 7,633,728 B2
(45) Date of Patent: *Dec. 15, 2009

(54) ARC FAULT CIRCUIT INTERRUPTER AND METHOD OF PARALLEL ARC FAULT DETECTION

(75) Inventors: Kevin L. Parker, Pittsburgh, PA (US); Robert T. Elms, Monroeville, PA (US)

(73) Assignee: Eaton Corporation, Cleveland, OH (US)

( * ) Notice: Subject to any disclaimer, the term of this patent is extended or adjusted under 35 U.S.C. 154(b) by 400 days.

This patent is subject to a terminal disclaimer.

(21) Appl. No.: 11/679,299

(22) Filed: Feb. 27, 2007

(65) Prior Publication Data

US 2008/0204955 A1 Aug. 28, 2008

(51) Int. Cl.
*H02H 3/00* (2006.01)
*H02H 9/08* (2006.01)

(52) U.S. Cl. .............. 361/42; 361/43; 361/44; 361/45; 361/46; 361/47; 361/48; 361/49; 361/50; 361/93.1

(58) Field of Classification Search .......... None
See application file for complete search history.

(56) References Cited

U.S. PATENT DOCUMENTS

| | | | |
|---|---|---|---|
| 5,224,006 A | 6/1993 | MacKenzie et al. | |
| 5,691,869 A | 11/1997 | Engel et al. | |
| 6,522,228 B2 | 2/2003 | Wellner et al. | |
| 6,522,509 B1 | 2/2003 | Engel et al. | |
| 6,542,056 B2 | 4/2003 | Nerstrom et al. | |
| 6,710,688 B2 | 3/2004 | Wellner et al. | |
| 6,798,628 B1 * | 9/2004 | Macbeth | 361/42 |
| 2006/0072256 A1 | 4/2006 | Miller et al. | |
| 2008/0204949 A1 * | 8/2008 | Zhou et al. | 361/42 |

OTHER PUBLICATIONS

Underwriters Laboratories, Inc., "UL 1699 Arc-Fault Circuit-Interrupters", Apr. 7, 2006, 112 pp.

* cited by examiner

*Primary Examiner*—Albert W Paladini
*Assistant Examiner*—Dharti Patel
(74) *Attorney, Agent, or Firm*—Martin J. Moran

(57) ABSTRACT

An arc fault circuit interrupter includes separable contacts, an operating mechanism, a current sensor sensing current flowing through the contacts and outputting a sensed current, and a processor determining and storing peak values of the sensed current for plural half-cycles. The processor provides arc fault detection, determines whether a first predetermined plurality of half-cycles occur in succession and correspond to non-unity power factor, and responsively inhibits the detection for a first predetermined time, and whether a second predetermined plurality of half-cycles occur in succession, each with smaller peak amplitude than that of an immediately preceding half-cycle of like or differing polarity, and responsively inhibits the detection for a second predetermined time. The processor determines that the detection is not inhibited for the first and second predetermined times, and responsively indicates that any of the half-cycles having a peak amplitude greater than a predetermined amount is a parallel arc.

27 Claims, 4 Drawing Sheets

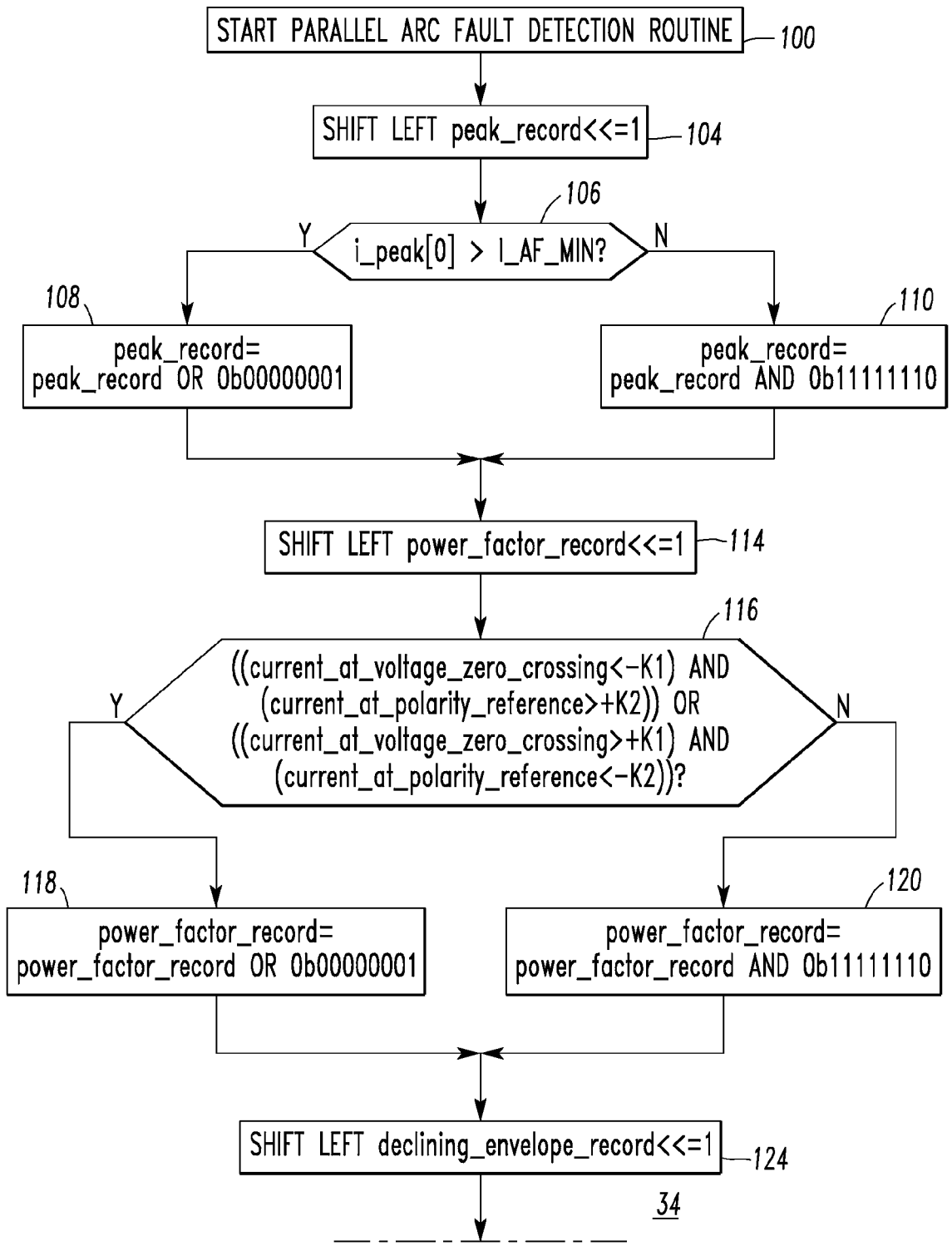
FIG.2A1

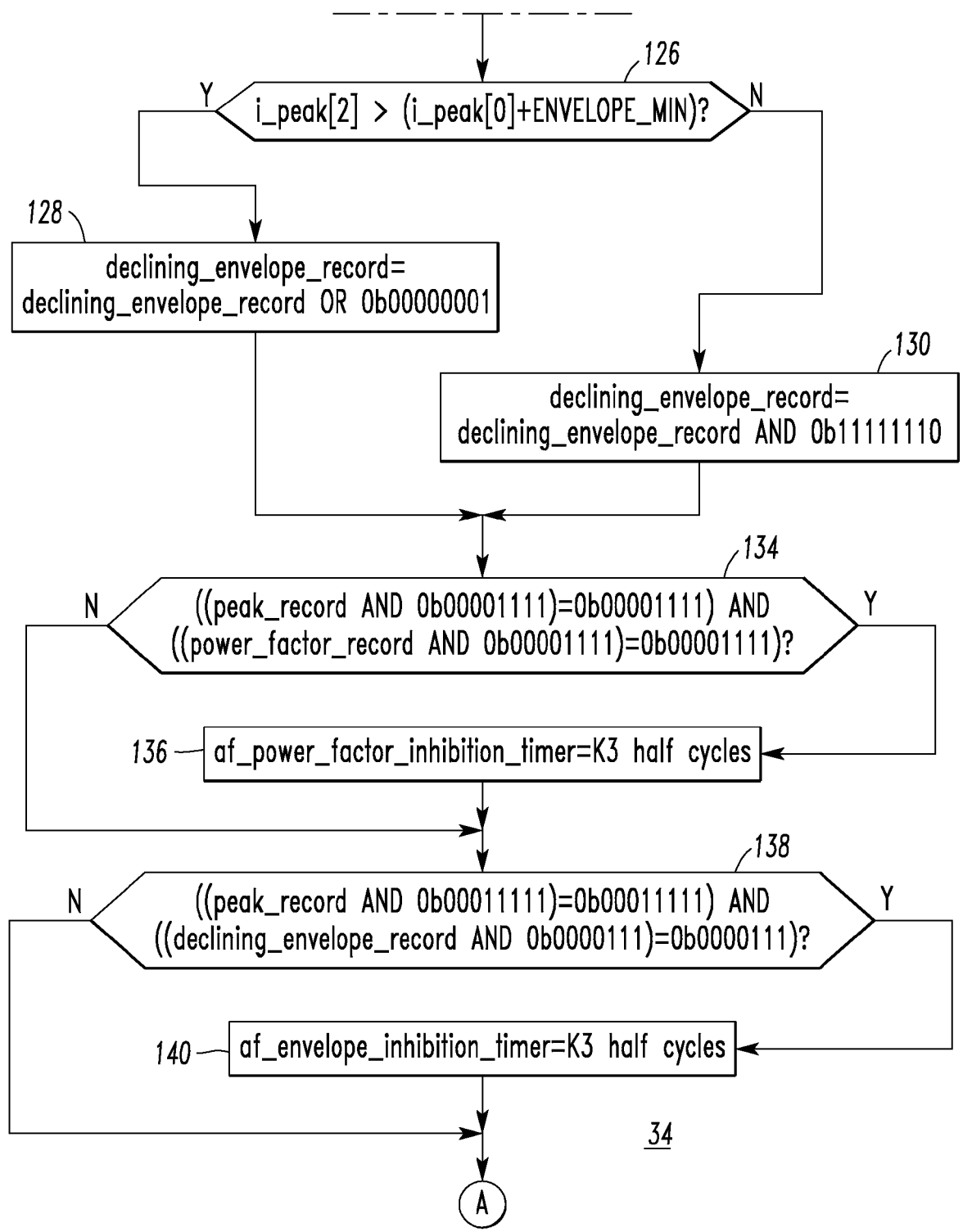
FIG.2A2

ARC FAULT CIRCUIT INTERRUPTER AND METHOD OF PARALLEL ARC FAULT DETECTION

CROSS-REFERENCE TO RELATED APPLICATION

This application is related to commonly assigned, concurrently filed:

U.S. patent application Ser. No. 11/679,281, filed Feb. 27, 2007, entitled "Arc Fault Circuit Interrupter and Method of Parallel and Series Arc Fault Detection.

BACKGROUND OF THE INVENTION

1. Field of the Invention

This invention pertains generally to circuit interrupters and, more particularly, to arc fault circuit interrupters. The invention also relates to methods of detecting parallel arc faults.

2. Background Information

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

An arc fault circuit interrupter (AFCI) is a device intended to mitigate the effects of arc faults by functioning to de-energize an electrical circuit when an arc fault is detected. Non-limiting examples of AFCIs include: (1) arc fault circuit breakers; (2) branch/feeder arc fault circuit interrupters, which are intended to be installed at the origin of a branch circuit or feeder, such as a panelboard, and which may provide protection from ground faults and line-to-neutral faults; (3) outlet circuit arc fault circuit interrupters, which are intended to be installed at a branch circuit outlet, such as an outlet box, in order to provide protection of cord sets and power-supply cords connected to it (when provided with receptacle outlets) against the unwanted effects of arcing, and which may provide protection from line-to-ground faults and line-to-neutral faults; (4) cord arc fault circuit interrupters, which are intended to be connected to a receptacle outlet, in order to provide protection to an integral or separate power supply cord; (5) combination arc fault circuit interrupters, which function as either a branch/feeder or an outlet circuit AFCI; and (6) portable arc fault circuit interrupters, which are intended to be connected to a receptacle outlet and provided with one or more outlets.

During sporadic arc fault conditions, the overload capability of a conventional circuit breaker will not function since the root-mean-squared (RMS) value of the fault current is too small to activate the automatic trip circuit. The addition of electronic arc fault sensing to a circuit breaker can add one of the elements required for sputtering arc fault protection—ideally, the output of an electronic arc fault sensing circuit directly trips and, thus, opens the circuit breaker. See, for example, U.S. Pat. Nos. 6,710,688; 6,542,056; 6,522,509; 6,522,228; 5,691,869; and 5,224,006.

Arc faults can be series or parallel. Examples of a series arc are a broken wire where the ends of the broken wire are close enough to cause arcing, or a relatively poor electrical connection. Parallel arcs occur between conductors of different potential including, for example, a power conductor and a ground. Arc faults occur in series with the source and series arcs are further in series with the load. Arc faults have a relatively high impedance. Thus, a series arc results in a reduction in load current and is not detected by the normal overload and overcurrent protection of conventional protection devices. Even the parallel arc, which can draw current in excess of normal rated current in a circuit, produces currents which can be sporadic enough to yield RMS values less than that required to produce a thermal trip, or at least delay operation. Effects of the arc voltage and line impedance often prevent the parallel arc from reaching current levels sufficient to actuate the instantaneous trip function.

U.S. Pat. No. 6,522,509 discloses an arc fault detector including a current detector detecting the alternating current flowing in an electrical circuit, and a processor which generates a cumulative sum of amounts by which the alternating current in each most recent cyclic interval exceeds the current in the immediately preceding half-cycle in absolute magnitude. An arc fault indication is generated when this cumulative sum reaches a selected level. The cumulative sum is time attenuated and the arc fault indication is generated when the time attenuated cumulative sum reaches a selected level. The processor adds the calculated differential to the time attenuated cumulative sum for cyclic intervals in which the current exceeds that for the immediately preceding cyclic interval in absolute magnitude by a selected amount after a first cyclic interval in which the current exceeds a selected arming magnitude. Hence, it takes a cyclic interval with current of a magnitude above the selected magnitude to arm the system. The processor terminates adding to the attenuated cumulative sum when the sum attenuates to a predetermined minimum level. At this point, the system is disarmed and the cumulative sum is cleared.

U.S. Patent Application Publication No. 2006/0072256 discloses an "event driven" arc fault detection method that is inactive (e.g., dormant) until a current pulse is detected by a comparator. When such a current pulse occurs, an algorithm records the peak amplitude of the current pulse as determined by a peak detector circuit and an analog-to-digital converter, along with the time since the last current pulse occurred as measured by a timer. An amount equivalent to the peak amplitude of the current pulse is added to an accumulator. That accumulator amount is decayed over time. An arc fault in the power circuit is determined if the amount stored in the accumulator exceeds a predetermined value. If the peak amplitude of the current pulse is greater than a predetermined magnitude, then the algorithm is responsively activated from the inactive state. The algorithm employs a plurality of half-cycles of current flowing in the power circuit including a present half-cycle and a number of previous half-cycles. The half-cycles are defined by a current pulse having a peak amplitude of greater than the predetermined magnitude. The algorithm determines that the time to the present half-cycle from the previous half-cycle which is immediately prior to the present half-cycle is greater than a predetermined time and responsively adds a predetermined amount to an accumulator. The amount stored in the accumulator is decayed over time. An arc fault is determined in the power circuit if the amount stored in the accumulator exceeds a predetermined value.

There is room for improvement in arc fault circuit interrupters.

There is also room for improvement in methods of detecting parallel arc faults.

SUMMARY OF THE INVENTION

These needs and others are met by embodiments of the invention, which provide an arc fault circuit interrupter that prevents parallel arc fault nuisance trips caused by motor inrush and/or incandescent dimmer turn-on current transients. Parallel arc faults should never exhibit a non-unity power factor. Also, peak current amplitudes in parallel arc faults will vary randomly, but do not decline in a monotonic fashion. Therefore, if a relatively high-amplitude current in a power system exhibits either a non-unity power factor or a continuously declining amplitude, then it is safely assumed to not be a parallel arc fault.

In accordance with one aspect of the invention, an arc fault circuit interrupter comprises: separable contacts; a neutral conductor; an operating mechanism structured to open and close the separable contacts; a current sensor structured to sense current flowing through the separable contacts and output a sensed current value; and a processor cooperating with the current sensor to determine and store a plurality of peak values of the sensed current value for a plurality of half-cycles of the current flowing through the separable contacts, wherein the processor is structured to provide arc fault detection and to determine at least one of: (a) whether a first predetermined plurality of the half-cycles of the current occur in succession and correspond to a non-unity power factor and to responsively inhibit the arc fault detection for a first predetermined time, and (b) whether a second predetermined plurality of the half-cycles of the current occur in succession and each of the second predetermined plurality of the half-cycles of the current has a smaller peak amplitude than that of an immediately preceding one of the half-cycles of the current of like polarity or of differing polarity, and to responsively inhibit the arc fault detection for a second predetermined time, and wherein the processor is further structured to determine that the arc fault detection is not inhibited for at least one of the first predetermined time and the second predetermined time, and to responsively indicate that at least one of the half-cycles of the current having a peak amplitude greater than or equal to a predetermined amount is a parallel arc.

The processor may be further structured to indicate a parallel arc fault in response to a predetermined plurality of occurrences of the parallel arc, the occurrences each being separated from one another by no more than a third predetermined time.

The processor may be further structured to determine both of such (a) whether a first predetermined plurality of the half-cycles of the current occur in succession and correspond to a non-unity power factor and such (b) whether a second predetermined plurality of the half-cycles of the current occur in succession and each of the second predetermined plurality of the half-cycles of the current has a smaller peak amplitude than that of an immediately preceding one of the half-cycles of the current of like polarity or of differing polarity, and further to determine that the arc fault detection is not inhibited for both of the first predetermined time and the second predetermined time.

The processor may be further structured to sense a zero crossing of a line-to-neutral voltage between one of the separable contacts and the neutral conductor, and to determine whether the sensed current value corresponds to a non-unity power factor for each of the half-cycles of the current.

The processor may be further structured to determine if the peak values have exceeded the predetermined amount for each of the last about four of the half-cycles, and to determine a non-unity power factor for each of the last about four of the half-cycles.

The processor may be further structured to determine if the peak values have exceeded the predetermined amount for each of the last about five to about seven of the half-cycles, and to determine if the peak values have declined for each of the last at least three of the half-cycles.

As another aspect of the invention, a method of detecting parallel arc faults in a power circuit comprises: (a) sensing a plurality of half-cycles of current flowing in the power circuit; (b) providing arc fault detection of the current flowing in the power circuit; (c) ignoring any of the half-cycles of current having a peak amplitude less than a predetermined amount; (d) determining at least one of: (i) whether a first predetermined plurality of the half-cycles of current occur in succession and have non-unity power factor and responsively inhibiting the arc fault detection for a first predetermined time, and (ii) whether a second predetermined plurality of the half-cycles of current occur in succession and each of the second predetermined plurality of the half-cycles of current has a smaller peak amplitude than that of an immediately preceding one of the half-cycles of current of like polarity or of differing polarity, and responsively inhibiting the arc fault detection for a second predetermined time; and (e) determining whether the (c) ignoring and the (d) determining are not met, and responsively indicating that at least one of the half-cycles of current having a peak amplitude greater than or equal to the predetermined amount is a parallel arc.

The method may further comprise counting occurrences of the parallel arc, which are each separated from one another by no more than a third predetermined time; and indicating a parallel arc fault in response to a predetermined plurality of the occurrences of the parallel arc, which are each separated from one another by no more than the third predetermined time.

The method may determine whether the first predetermined plurality of the half-cycles of current occur in succession and have non-unity power factor, in order to distinguish a motor start inrush current transient from a parallel arc fault.

The method may determine whether the second predetermined plurality of the half-cycles of current occur in succession and each of the second predetermined plurality of the half-cycles of current has a smaller peak amplitude than that of an immediately preceding one of the half-cycles of current of like polarity or of differing polarity, in order to distinguish an incandescent dimmer inrush current from a parallel arc fault.

BRIEF DESCRIPTION OF THE DRAWINGS

A full understanding of the invention can be gained from the following description of the preferred embodiments when read in conjunction with the accompanying drawings in which:

FIGS. 2A1-2A2 and 2B form a flowchart of a parallel arc fault detection routine executed by the processor of FIG. 1.

DESCRIPTION OF THE PREFERRED EMBODIMENTS

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "number" shall mean one or an integer greater than one (i.e., a plurality).

The invention is described in association with a miniature circuit breaker, although the invention is applicable to a wide range of circuit interrupters.

Figure 1:
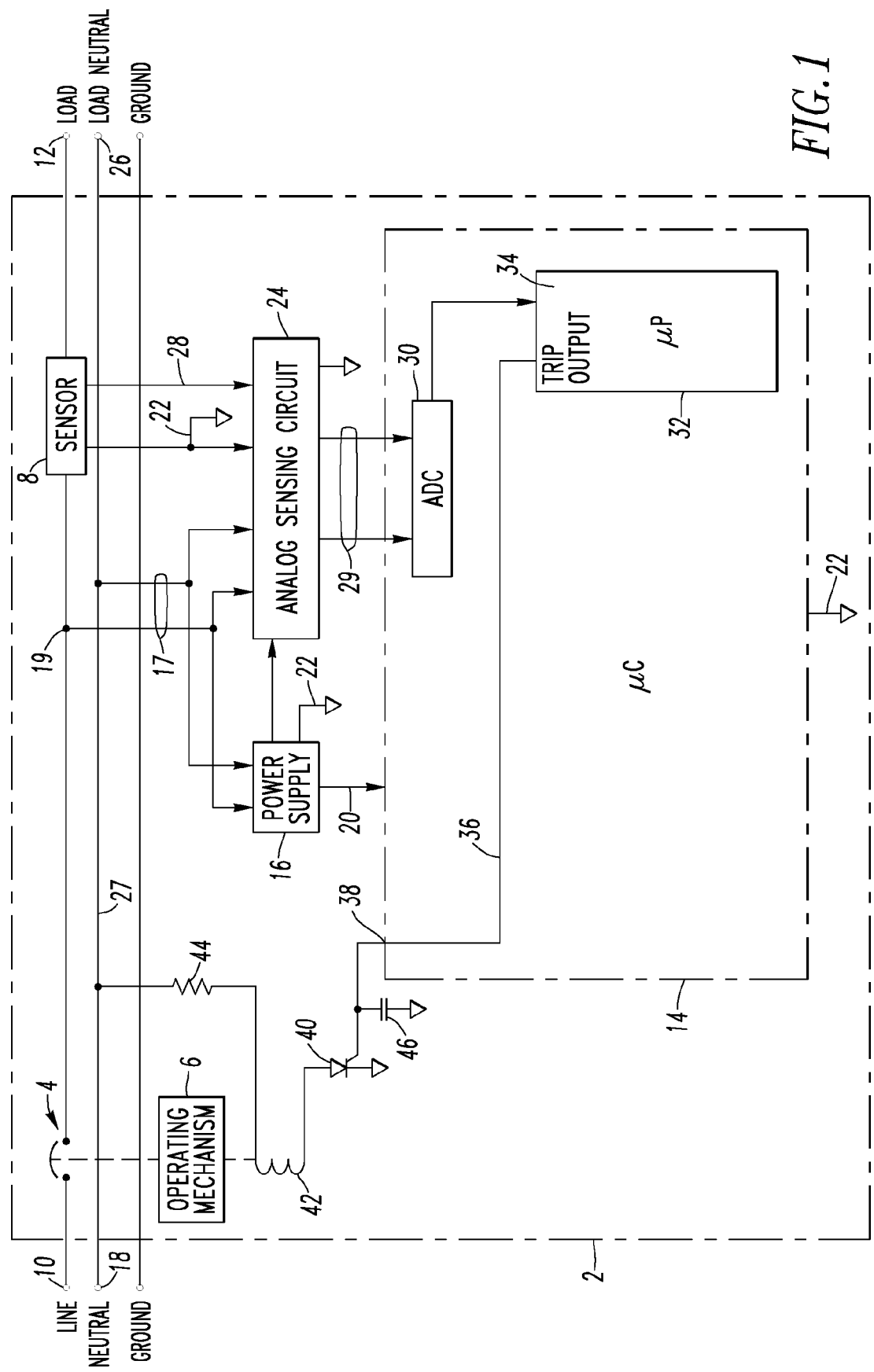
FIG. 1 is a block diagram in schematic form of a circuit breaker including a processor in accordance with an embodiment of the invention.

Referring to FIG. 1, a miniature circuit breaker 2 includes separable contacts 4, an operating mechanism 6 structured to open and close the separable contacts 4, and a sensor 8 structured to sense current flowing through the separable contacts 4 between a line terminal 10 and a load terminal 12. The circuit breaker 2 also includes a processor, such as the example microcomputer (μC) 14 (e.g., without limitation, a Microchip PIC16F685 microcontroller, marketed by Microchip Technology Incorporated of Chandler, Ariz.), cooperating with the sensor 8 and the operating mechanism 6 to trip open the separable contacts 4, and a power supply 16 structured to at least power the μC 14. The power supply 16 is, for example, an alternating current (AC) to direct current (DC) (AC/DC) power supply which receives a line-to-neutral voltage 17 between a neutral terminal 18 and a conductor 19 that is electrically connected downstream of the separable contacts 4 and to or toward the load terminal 12. The AC/DC power supply 16 provides a suitable DC voltage 20 and a common 22 to the μC 14 and, as needed, powers an analog sensing circuit 24.

The analog sensing circuit 24 receives inputs of the line-to-neutral voltage 17, as referenced to the neutral terminal 18, a load neutral terminal 26 and a neutral conductor 27, and a voltage 28 representative of the load current (e.g., without limitation, the line current flowing through the current sensor 8). The two output voltage signals 29 from the analog sensing circuit 24 are input by a plural channel analog-to-digital converter (ADC) 30 of the μC 14 and are converted to corresponding digital values for input by μP 32. The μP 32 includes a parallel arc fault detection routine 34 as will be explained.

Responsive to one or more conditions as sensed from the voltages 17 and 28, the μP 32 generates a trip signal 36 that passes through the μC 14 to output 38, which turns SCR 40 on. The SCR 40, in turn, energizes a trip solenoid 42 and, thereby, actuates the operating mechanism 6 to trip open the separable contacts 4 in response to, for example, an overvoltage, an arc fault or other trip condition. The trip solenoid 42 is, thus, a trip actuator cooperating with the μP 32 and the operating mechanism 6 to trip open the separable contacts 4 responsive to one of the different trip conditions detected by the μP 32. A resistor 44 in series with the coil of the solenoid 42 limits the coil current and a capacitor 46 protects the gate of the SCR 40 from voltage spikes and false tripping due to noise.

EXAMPLE 1

The disclosed arc fault detection routine 34 ignores any line current pulses with a peak amplitude less than a predetermined amount (e.g., without limitation, about 50 A peak). If four half-cycles of line current with non-unity power factor occur in succession, then arc fault detection is inhibited for a predetermined time (e.g., without limitation, about 0.3 seconds). For example, this can distinguish a motor (e.g., without limitation, chop saw; air compressor motor) start inrush current transient from a parallel arc fault. If at least three half-cycles of line current with a continuously decreasing peak amplitude occur in succession (or in successive line cycles of like polarity), then the routine 34 inhibits arc fault detection for a predetermined time (e.g., without limitation, about 0.3 seconds). For example, this can distinguish an incandescent dimmer inrush current from a parallel arc fault. Otherwise, if the previous three conditions are not met, then any half-cycle of current with a peak amplitude greater than the predetermined amount (e.g., without limitation, about 50 A peak) is assumed to be a parallel arc. If about five to about seven such arcing half-cycles occur, which are each separated from one another by no more than a predetermined time (e.g., without limitation, 0.5 seconds), then a parallel arc fault is identified.

EXAMPLE 2

Referring to FIGS. 2A1-2A2 and 2B, the parallel arc fault detection routine 34 is shown. The routine 34 starts at 100 after which even steps 104-110 process peak current inhibition conditions and keep a record of whether recent AC line half-cycles have a peak current magnitude (i.e., absolute value) (i_peak) that is greater than a predetermined minimum arc fault peak current (I_AF_MIN) (e.g., without limitation, 50 A peak; any suitable current value which is considered to correspond to a potential parallel arc fault). At 104, the bits in peak_record are shifted left by one position. Then, at 106, it is determined if the most recent peak current magnitude (i.e., absolute value) (i_peak[0]) is greater than the predetermined minimum arc fault peak current. If so, then at 108, the lowest order bit in peak_record is set. Otherwise, at 110, the lowest order bit in peak_record is cleared.

After either 108 or 110, even steps 114-120 use AC (e.g., without limitation, 60 Hz) current information to detect non-unity power factor. At 114, the bits in power_factor_record are shifted left by one position. Then, at 116, it is determined if the signed (i.e., positive or negative) line current at the voltage zero crossing (current_at_voltage_zero_crossing) was a different polarity than what the current is, for example, 90° later, at a suitable signed (i.e., positive or negative) polarity reference (current_at_polarity_reference). For example, the line current at the voltage zero crossing may be measured in response to a microcomputer interrupt initiated in response to the zero crossing of the line-to-neutral voltage 17, and the line current at the polarity reference may be measured in response to a microcomputer timer interrupt that is preset to occur a suitable time after the previous zero crossing interrupt. In step 116, K1 and K2 are predetermined constant current values of, for example and without limitation, 2 A and 10 A, respectively. If the test at 116 passes, then at 118, the lowest order bit in power_factor_record is set, since there is non-unity power factor for the most recent half-cycle. Otherwise, at 120, the lowest order bit in power_factor_record is cleared, since there is unity power factor for the current half-cycle.

Even steps 124-130 use AC current information to detect a continuously declining pattern of peak current. At 124, the bits in declining_envelope_record are shifted left by one position. Then, at 126, it is determined if the peak line current of the previous half-cycle of the same polarity (i_peak[2]) is greater than the most recent peak current (i_peak[0]) plus a predetermined minimum envelope value (ENVELOPE_MIN) (e.g., without limitation, 1 A; any suitable minimum value). Here, the peak line current of the immediately previous half-cycle of the opposite polarity is i_peak[1]. Step 126 determines if the most recent peak current (i_peak[0]) is sufficiently less than the peak line current of the previous half-cycle of the same polarity (i_peak[2]). If so, then at 128, the lowest order bit in declining_envelope_record is set. Otherwise, at 130, the lowest order bit in declining_envelope_record is cleared.

Next, even steps 134-140 process arc fault inhibition conditions. First, at 134, it is determined if the peak current has exceeded the predetermined minimum arc fault current for each of the last four half-cycles, and if the load has also exhibited a non-unity power factor for each of those last four half-cycles. If so, then at 136, an arc fault power factor inhibition timer (af_power_factor_inhibition_timer) is set to a suitable count of half-cycles (e.g., without limitation, K3=36 half-cycles or 0.3 seconds). Next, at 138, which occurs after 136 or after the failure of the test at 134, it is determined if the peak current has exceeded the predetermined minimum arc fault current for each of the last about five to about seven half-cycles, and if the load has also exhibited a declining envelope for each of the last at least three half-cycles. If so, then at 140, an arc fault envelope inhibition timer (af_envelope_inhibition_timer) is set to a suitable count of half-cycles.

Figure 2B:
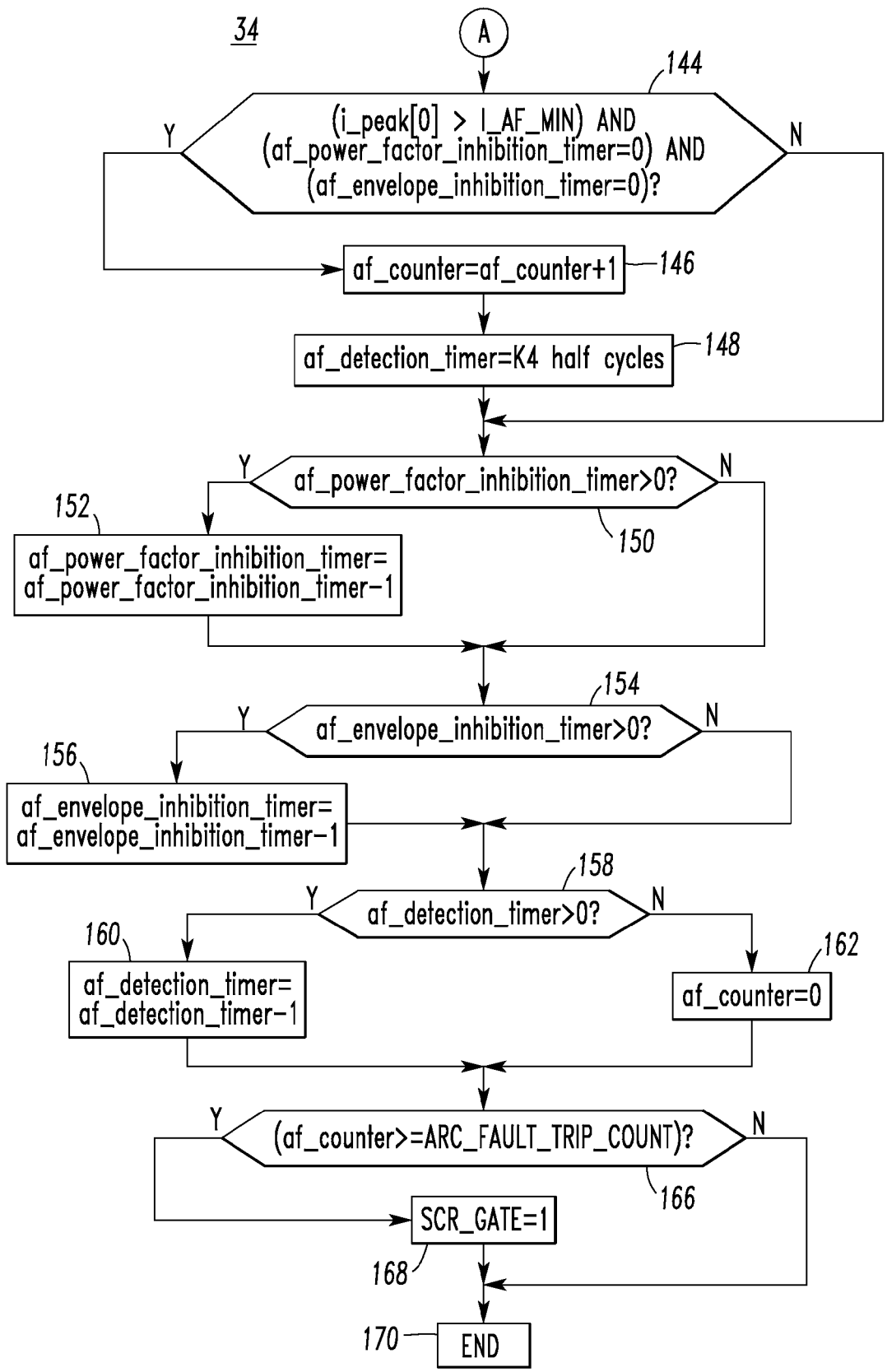

Next, at even steps 144 and 146 of FIG. 2B, which occur after 140 or after the failure of the test at 138, if the arc fault routine 34 has not been inhibited (e.g., by the timers of steps 136 and 140 of FIG. 2A2), then any peak current of sufficient amplitude is accumulated. Step 144 determines if the most recent peak current (i_peak[0]) of the present half-cycle of current is considered to be a parallel arc of sufficient magnitude. If not, then execution resumes at 150. On the other hand, if there is a parallel arc of sufficient magnitude, then at 146, the arc fault tally (af_counter) is incremented. Next, at 148, an arc fault detection timer (af_detection_timer) is set to a suitable count of half-cycles (e.g., without limitation, K4=60 half-cycles or 0.5 seconds). Then, at 150, it is determined if the power factor inhibition timer is active. If so, then at 152, the power factor inhibition timer is decremented. After 152, or if the test at 150 failed, at 154, it is determined if the envelope inhibition timer is active. If so, then at 156, the envelope inhibition timer is decremented. After 156, or if the test at 154 failed, at 158, it is determined if the arc fault detection timer is active. If so, then at 160, the arc fault detection timer is decremented. Otherwise, at 162, the arc fault tally is cleared. After either 160 or 162, even steps 166 and 168 are employed to trip the circuit breaker 2 in response to a dangerous condition. Step 166 determines if a parallel arc fault has occurred by checking whether the arc fault tally of 146 is greater than or equal to a suitable predetermined value (ARC_FAULT_TRIP_COUNT) (e.g., without limitation, about 5; any suitable value). If so, then at 168, the circuit breaker 2 is tripped by setting the output 38 (SCR_GATE) true. After 168, or if the test at 166 failed, the routine 34 ends for the present half-cycle at 170.

The routine 34 is executed for each half-cycle of the line voltage. Hence, the μP 32 and the routine 34 cooperate with the current sensor 8 to determine and store a peak value (i_peak[n]) of the sensed current value 28 for a plurality of half-cycles of the line current, wherein n is an integer that ranges, in this example, from 0 to at least about 4.

Prior to the first running of the routine 34, the variables peak_record, i_peak, power_factor_record, declining_envelope_record and af_counter, and the timers af_power_factor_inhibition_timer, af_envelope_inhibition_timer and af_detection_timer are zeroed. In the disclosed embodiment, the timers or counters of steps 136, 140 and 148 are variables, although actual software and/or hardware timers or counters may be employed.

EXAMPLE 3

Step 126 of FIG. 2A2 is suitable regardless whether the sensor 8 of FIG. 1 is immune or susceptible to certain offset errors in sensing the peak line current (i_peak). For example, if the sensor 8 is a resistive current sensor, then the circuit 24 and ADC 30 are relatively immune to offset errors. However, if the sensor 8 is a Rogowski coil or other di/dt current sensor and the circuit 24 provides an integrator, then the ADC 30 may be susceptible to offset errors. Step 126 determines if the most recent peak current (i_peak[0]) is sufficiently less than the peak line current of the previous half-cycle of the same polarity (i_peak[2]). Here, those two peak currents of the same polarity have the same offset of the same polarity. Hence, the offset is not a problem.

Alternatively, when the sensor 8, circuit 24 and ADC 30 are relatively immune to offset errors, step 126 may determine if the most recent peak current (i_peak[0]) is sufficiently less than the peak line current of the immediately preceding half-cycle of differing polarity (i_peak[1]).

EXAMPLE 4

As an alternative to step 116, non-unity power factor may be determined if the signed (i.e., positive or negative) line current at the voltage zero crossing (current_at_voltage_zero_crossing) was a different polarity than what the line-to-neutral voltage 17 is, for example, 90° later, at a suitable signed (i.e., positive or negative) polarity reference (voltage_at_polarity_reference). In both step 116 and this Example 4, the determination of non-unity power factor is assumed to be indicative of normal operation and not of parallel arcing.

The disclosed method for detecting parallel arc faults is believed to be highly reliable and ideally suited for implementation by, for example, low-cost microcontrollers.

Although separable contacts 4 are disclosed, suitable solid state separable contacts may be employed. For example, the disclosed circuit breaker 2 includes a suitable circuit interrupter mechanism, such as the separable contacts 4 that are opened and closed by the operating mechanism 6, although the invention is applicable to a wide range of circuit interruption mechanisms (e.g., without limitation, solid state or FET switches; contactor contacts) and/or solid state based control/protection devices (e.g., without limitation, drives; soft-starters).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An arc fault circuit interrupter comprising:
    separable contacts;
    a neutral conductor;
    an operating mechanism structured to open and close said separable contacts;
    a current sensor structured to sense current flowing through said separable contacts and output a sensed current value; and a processor cooperating with said current sensor to determine and store a plurality of peak values of the sensed current value for a plurality of half-cycles of said current flowing through said separable contacts, wherein said processor is structured to provide arc fault detection and to determine at least one of:
(a) whether a first predetermined plurality of said half-cycles of said current occur in succession and correspond to a non-unity power factor, and to responsively inhibit said arc fault detection for a first predetermined time, and
(b) whether a second predetermined plurality of said half-cycles of said current occur in succession and each of said second predetermined plurality of said half-cycles of said current has a smaller peak amplitude than that of an immediately preceding one of said half-cycles of said current of like polarity or of differing polarity, and to responsively inhibit said arc fault detection for a second predetermined time, and wherein said processor is further structured to determine that said arc fault detection is not inhibited for at least one of said first predetermined time and said second predetermined time, and to responsively indicate that at least one of said half-cycles of said current having a peak amplitude greater than or equal to a predetermined amount is a parallel arc.

2. The arc fault circuit interrupter of claim 1 wherein said processor is further structured to indicate a parallel arc fault in response to a predetermined plurality of occurrences of said parallel arc, said occurrences each being separated from one another by no more than a third predetermined time.

3. The arc fault circuit interrupter of claim 2 wherein said processor is further structured to trip open said separable contacts in response to said indicate a parallel arc fault.

4. The arc fault circuit interrupter of claim 1 wherein said processor is further structured to determine both of said (a) whether a first predetermined plurality of said half-cycles of said current occur in succession and correspond to a non-unity power factor and said (b) whether a second predetermined plurality of said half-cycles of said current occur in succession and each of said second predetermined plurality of said half-cycles of said current has a smaller peak amplitude than that of an immediately preceding one of said half-cycles of said current of like polarity or of differing polarity; and wherein said processor is further structured to determine that said arc fault detection is not inhibited for both of said first predetermined time and said second predetermined time.

5. The arc fault circuit interrupter of claim 1 wherein said processor is further structured to store said sensed current value over said plurality of half-cycles of said current flowing in said power circuit, and to ignore any of said half-cycles of said current having a peak amplitude less than said predetermined amount.

6. The arc fault circuit interrupter of claim 1 wherein said processor comprises at least one timer responsive to at least one of said inhibit said arc fault detection for a first predetermined time and said inhibit said arc fault detection for a second predetermined time.

7. The arc fault circuit interrupter of claim 1 wherein said processor is further structured to sense a zero crossing of a line-to-neutral voltage between one of said separable contacts and said neutral conductor, and to determine whether said sensed current value corresponds to a non-unity power factor for each of said half-cycles of said current.

8. The arc fault circuit interrupter of claim 1 wherein said predetermined amount is equal to about 50 A peak.

9. The arc fault circuit interrupter of claim 1 wherein said peak values include a first peak value of the current one of said half-cycles and a second peak value of the previous one of said half-cycles having the same polarity as the current one of said half-cycles; and wherein said processor is further structured to determine if said second peak value is greater than said first peak value plus a predetermined value.

10. The arc fault circuit interrupter of claim 1 wherein said processor is further structured to determine if said peak values have exceeded said predetermined amount for each of the last about four of said half-cycles, and to determine a non-unity power factor for each of said last about four of said half-cycles.

11. The arc fault circuit interrupter of claim 1 wherein said processor is further structured to determine if said peak values have exceeded said predetermined amount for each of the last about five to about seven of said half-cycles, and to determine if said peak values have declined for each of the last at least three of said half-cycles.

12. A method of detecting parallel arc faults in a power circuit, said method comprising:
(a) sensing a plurality of half-cycles of current flowing in said power circuit;
(b) providing arc fault detection of said current flowing in said power circuit;
(c) ignoring any of said half-cycles of current having a peak amplitude less than a predetermined amount;
(d) determining at least one of:
(i) whether a first predetermined plurality of said half-cycles of current occur in succession and have non-unity power factor and responsively inhibiting said arc fault detection for a first predetermined time, and
(ii) whether a second predetermined plurality of said half-cycles of current occur in succession and each of said second predetermined plurality of said half-cycles of current has a smaller peak amplitude than that of an immediately preceding one of said half-cycles of current of like polarity or of differing polarity, and responsively inhibiting said arc fault detection for a second predetermined time; and
(e) determining whether said (c) ignoring and said (d) determining are not met, and responsively indicating that at least one of said half-cycles of current having a peak amplitude greater than or equal to said predetermined amount is a parallel arc.

13. The method of claim 12 further comprising
counting occurrences of said parallel arc, which are each separated from one another by no more than a third predetermined time; and
indicating a parallel arc fault in response to a predetermined plurality of said occurrences of said parallel arc, which are each separated from one another by no more than said third predetermined time.

14. The method of claim 13 further comprising
employing about 0.5 seconds as said third predetermined time.

15. The method of claim 13 further comprising
tripping open separable contacts responsive to said indicating a parallel arc fault.

16. The method of claim 12 further comprising
employing about 50 A peak as said predetermined amount.

17. The method of claim 12 further comprising
determining both of said (i) whether a first predetermined plurality of said half-cycles of current occur in succession and have non-unity power factor, and said whether a second predetermined plurality of said half-cycles of current occur in succession and each of said (ii) second predetermined plurality of said half-cycles of current has a smaller peak amplitude than that of an immediately preceding one of said half-cycles of current of like polarity or of differing polarity.

18. The method of claim 12 further comprising employing about four as said first predetermined plurality.

19. The method of claim 12 further comprising employing about 0.3 seconds as said first predetermined time.

20. The method of claim 12 further comprising employing at least three as said second predetermined plurality.

21. The method of claim 12 further comprising employing about 0.3 seconds as said second predetermined time.

22. The method of claim 12 further comprising determining said (i) whether a first predetermined plurality of said half-cycles of current occur in succession and have non-unity power factor, in order to distinguish a motor start inrush current transient from a parallel arc fault.

23. The method of claim 12 further comprising determining said (ii) whether a second predetermined plurality of said half-cycles of current occur in succession and each of said second predetermined plurality of said half-cycles of current has a smaller peak amplitude than that of an immediately preceding one of said half-cycles of current of like polarity or of differing polarity, in order to distinguish an incandescent dimmer inrush current from a parallel arc fault.

24. The method of claim 12 further comprising employing a voltage having a voltage zero crossing; and
for each of said half-cycles, determining if said current flowing in said power circuit at the voltage zero crossing has a different polarity than said current flowing in said power circuit about 90° degrees after said voltage zero crossing, and responsively indicating a non-unity power factor.

25. The method of claim 12 further comprising employing a voltage having a voltage zero crossing;
for each of said half-cycles, sensing said voltage about 90° degrees after said voltage zero crossing; and
for each of said half-cycles, determining if said current flowing in said power circuit at said voltage zero crossing has a different polarity than said sensed voltage about 90° degrees after said voltage zero crossing, and responsively indicating a non-unity power factor.

26. The method of claim 12 further comprising incrementing an arc fault tally responsive to said parallel arc;
setting an arc fault detection timer to a third predetermined time; and
determining whether said arc fault tally is greater than a predetermined value and whether said arc fault detection timer has not expired and responsively indicating that a parallel arc fault has occurred.

27. The method of claim 26 further comprising clearing said arc fault tally responsive to expiration of said arc fault detection timer.

\* \* \* \* \*